UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

No. 875,416.     Specification of Letters Patent.     Patented Dec. 31, 1907.

Application filed September 13, 1907. Serial No. 393,534.

*To all whom it may concern:*

Be it known that I, CARLETON ELLIS, a citizen of the United States, and a resident of Larchmont, in the county of Westchester and State of New York, have invented certain new and useful Improvements in Finish-Removers, of which the following is a specification.

This invention relates to paint and varnish remover comprising an aqueous emulsion of organic solvents, and relates particularly to aqueous solutions of cellulose with these organic solvents.

Cellulose dissolves in a number of aqueous solutions to form viscid solutions, which are capable of forming fairly permanent emulsions with volatile organic solvents such as amyl alcohol, amyl acetate and other esters. Cellulose for instance may be dissolved in cuprammonium hydroxid or Schweitzer's reagent, or in chlorid of zinc, whereby the chlorid solution becomes materially thickened and capable of emulsification with various organic solvents.

A suitable composition may be made by dissolving cellulose in Schweitzer's reagent to form a thick syrupy liquid. To 10 volumes of this liquid there is gradually added with heating, as for instance in a suitable emulsifying apparatus, 7 volumes of a mixture composed of amyl alcohol, 4 parts, amyl acetate 2 parts and benzol 4 parts. Another formula comprises zinc chlorid dissolved in twice its weight of hydrochloric acid, thickening by the addition to and solution therein of pyroxylin or nitro cellulose to form a thick body. This solution is emulsified with about one half its volume of commercial allyl alcohol, such as is obtained from wood distillation. Another formula comprises cellulose dissolved in zinc chlorid solution, the latter containing preferably over 50 per cent. of zinc chlorid, whereby a thick liquid to a paste is obtained. One volume of this compound is emulsified with an equal volume of a mixture of 1 part creosote, 1 part amyl acetate and 1 part wood tar oil. Still another formula comprises casein and nitro-cellulose dissolved in a strong acid solution of zinc chlorid to make a suitably thickened aqueous solution and in emulsifying the mixture with a nearly equal volume of a mixture of solvents composed of resin spirits 1 part, adipin ketone 1 part, and benzol 1 part. Viscose may be likewise emulsified, but these solutions have little permanency.

By the use of solvents for cellulose, above described, it is possible to make removers having at will an alkaline, acid or neutral reaction, thus adapting the remover to the particular paint and varnish to be removed. It is also possible to use beside, or in lieu of the solvents mentioned, various alcohols and alcoholic bodies; wood and denatured alcohol, acetone and other ketones, as well as aldehydes, ethers and esters may be used to a greater or lesser degree; it being borne in mind that if the organic solvent is freely soluble in water that a too large an amount precipitates more or less of the cellulose from solution, thereby reducing the emulsifying tendency. Various mechanical thickeners, such as wood flour, or ordinary flour or starch, finely ground mineral matter, such as whiting, infusorial earth and the like may be added if desired. The organic solvents employed may be thickened if desired to render emulsification easier, or to restrain evaporation with such thickeners as waxes, pyroxylin and the like.

Having described my invention to the details of which description I, of course, do not limit myself what I claim is:

1. A finish remover comprising an emulsion of cellulose and volatile organic solvents.
2. A finish remover comprising a solution of cellulose and organic finish solvents, said composition having an emulsified character and being fluent and flowable.
3. A finish remover comprising an aqueous solution of cellulose and organic finish solvents.
4. A finish remover comprising an aqueous solution of cellulose and an alcoholic body.
5. A finish remover comprising an emulsion of a viscid aqueous solution of cellulose and finish solvents.
6. A finish remover comprising an emulsion of a viscid aqueous solution of cellulose, an alcoholic body and an aromatic hydrocarbon.
7. A finish remover comprising an emulsion of an aqueous solution of cellulose and volatile finish solvents.

8. A finish remover comprising an emulsion of a solution of cellulose in zinc chlorid and a mixture of organic solvents, comprising benzol and an alcoholic body.

9. A finish remover consisting of an emulsion of a thick syrupy solution of cellulose and a mixture of finish solvents, comprising water insoluble alcohols.

Signed at Larchmont in the county of Westchester and State of New York this 14th day of September A. D. 1907.

CARLETON ELLIS.

Witnesses:
   THEODORE ELLIS,
   BRIDELLA M. ELLIS.